(12) United States Patent
Grosse Bley et al.

(10) Patent No.: US 9,188,501 B2
(45) Date of Patent: Nov. 17, 2015

(54) METHOD FOR TESTING THE TIGHTNESS OF WATER CONDUCTING COMPONENTS IN A HOUSING

(75) Inventors: Werner Grosse Bley, Bonn (DE); Gerhard Küster, Köln (DE); Joachim Bergmann, Bielefeld (DE); Erik Woldt, Lippstadt (DE)

(73) Assignee: Inficon GmbH (DE)

( * ) Notice: Subject to any disclaimer, the term of this patent is extended or adjusted under 35 U.S.C. 154(b) by 757 days.

(21) Appl. No.: 13/511,866

(22) PCT Filed: Oct. 28, 2010

(86) PCT No.: PCT/EP2010/066403
§ 371 (c)(1),
(2), (4) Date: May 24, 2012

(87) PCT Pub. No.: WO2011/064067
PCT Pub. Date: Jun. 3, 2011

(65) Prior Publication Data
US 2012/0270324 A1    Oct. 25, 2012

(30) Foreign Application Priority Data

Nov. 27, 2009  (DE) .......................... 10 2009 056 172
Jan. 23, 2010   (DE) .......................... 10 2010 005 494

(51) Int. Cl.
*G01N 33/18*   (2006.01)
*G01M 3/04*    (2006.01)
*G01M 3/20*    (2006.01)

(52) U.S. Cl.
CPC ............... *G01M 3/042* (2013.01); *G01M 3/20* (2013.01)

(58) Field of Classification Search
CPC ...................................................... G01N 33/18
USPC .............................. 436/3, 39, 127, 131–132
See application file for complete search history.

(56) References Cited

U.S. PATENT DOCUMENTS

| | | | | |
|---|---|---|---|---|
| 2,759,175 A * | 8/1956 | Spalding | ...................... | 138/104 |
| 3,173,477 A * | 3/1965 | Cuzzone | .......................... | 165/70 |
| 3,712,327 A * | 1/1973 | Pagenkopf | .................. | 137/78.2 |
| 3,770,002 A * | 11/1973 | Brown | ......................... | 137/312 |
| 3,874,403 A * | 4/1975 | Fischer | ........................ | 137/386 |
| 3,894,138 A * | 7/1975 | Klaar | .............................. | 310/53 |
| 3,975,943 A * | 8/1976 | Brachet | ............................ | 73/40 |
| 4,138,856 A * | 2/1979 | Orlowski | ........................ | 62/181 |
| 4,139,057 A * | 2/1979 | Klaar | ....................... | 165/104.13 |
| 4,186,215 A * | 1/1980 | Buchel | ............................ | 426/86 |
| 4,232,546 A * | 11/1980 | Dumont | ......................... | 73/40.7 |

(Continued)

FOREIGN PATENT DOCUMENTS

DE       8214409 U1    9/1982

OTHER PUBLICATIONS

European Patent Office, ISR from corresponding PCT Appl. No. PCT/EP2010/066403, dated Jan. 11, 2011 (4 pgs.).

*Primary Examiner* — Arlen Soderquist
(74) *Attorney, Agent, or Firm* — Barclay Damon, LLP

(57) ABSTRACT

The invention relates to the use of an indicator for testing the tightness of water conducting components in a housing which is either mixed into the water or released upon contacting water drops or generated from a generative material upon contact with water. According to the invention, the presence of the indicator in gaseous or vaporous form is detected by a sensor.

5 Claims, 2 Drawing Sheets

(56) References Cited

U.S. PATENT DOCUMENTS

| | | | |
|---|---|---|---|
| 4,524,607 A * | 6/1985 | Pelletier et al. | 73/40.5 R |
| 4,669,791 A * | 6/1987 | Savill | 439/34 |
| 4,688,627 A * | 8/1987 | Jean-Luc et al. | 165/11.1 |
| 4,789,853 A * | 12/1988 | Gentiluomo | 340/604 |
| 4,918,975 A * | 4/1990 | Voss | 73/40.7 |
| 5,049,312 A * | 9/1991 | Quaife et al. | 252/408.1 |
| 5,070,723 A * | 12/1991 | Tsou et al. | 73/40.7 |
| 5,163,315 A * | 11/1992 | Asai et al. | 73/40.7 |
| 5,229,750 A * | 7/1993 | Welch et al. | 340/605 |
| 5,271,901 A * | 12/1993 | Issel et al. | 422/83 |
| 5,835,976 A * | 11/1998 | Kent et al. | 73/40.7 |
| 5,883,300 A * | 3/1999 | Johnson | 73/40 |
| 5,992,218 A * | 11/1999 | Tryba et al. | 73/40.5 R |
| 6,063,632 A | 5/2000 | Perkins | |
| 6,147,613 A * | 11/2000 | Doumit | 340/605 |
| 6,170,320 B1 * | 1/2001 | Scaringe et al. | 73/40.7 |
| 6,227,036 B1 * | 5/2001 | Yonak et al. | 73/40.5 A |
| 6,229,229 B1 * | 5/2001 | Sharp | 307/118 |
| 6,314,794 B1 * | 11/2001 | Seigeot | 73/40.7 |
| 6,460,405 B1 * | 10/2002 | Mayer et al. | 73/40.7 |
| 6,489,895 B1 * | 12/2002 | Apelman | 340/605 |
| 6,524,857 B1 * | 2/2003 | Perkins | 436/3 |
| 6,526,807 B1 * | 3/2003 | Doumit et al. | 73/40.5 R |
| 6,629,043 B1 * | 9/2003 | Poteat | 702/51 |
| 6,639,517 B1 * | 10/2003 | Chapman et al. | 340/605 |
| 6,690,281 B2 * | 2/2004 | Palmer | 340/604 |
| 6,792,967 B1 * | 9/2004 | Franklin | 137/312 |
| 6,873,263 B1 * | 3/2005 | Hohman | 340/602 |
| 6,941,829 B1 * | 9/2005 | Long | 73/866.5 |
| 7,082,959 B1 * | 8/2006 | Franklin | 137/312 |
| 7,150,180 B2 * | 12/2006 | Werner | 73/40.7 |
| 7,158,039 B2 * | 1/2007 | Hayashida et al. | 340/605 |
| 7,213,534 B2 * | 5/2007 | Siikaluoma et al. | 116/206 |
| 7,253,741 B2 * | 8/2007 | Fiorletta et al. | 340/605 |
| 7,423,542 B1 * | 9/2008 | Mitsis et al. | 340/618 |
| 7,489,253 B2 * | 2/2009 | Murphy | 340/605 |
| 7,631,666 B1 * | 12/2009 | Ng et al. | 138/104 |
| 7,696,889 B2 * | 4/2010 | David | 340/605 |
| 8,457,908 B2 * | 6/2013 | Patel et al. | 702/51 |
| 2003/0056572 A1 * | 3/2003 | Werner | 73/40.7 |
| 2003/0154768 A1 * | 8/2003 | Shioya et al. | 73/40.7 |
| 2004/0003653 A1 * | 1/2004 | Avila | 73/40.7 |
| 2004/0046671 A1 * | 3/2004 | Ninberg | 340/605 |
| 2004/0115818 A1 * | 6/2004 | Puri et al. | 436/3 |
| 2004/0126888 A1 * | 7/2004 | Puri | 436/3 |
| 2005/0160963 A1 * | 7/2005 | Siikaluoma et al. | 116/206 |
| 2005/0162280 A1 * | 7/2005 | Hayashida et al. | 340/605 |
| 2005/0287276 A1 * | 12/2005 | Lavoie et al. | 426/590 |
| 2006/0154371 A1 * | 7/2006 | Organiscak et al. | 436/3 |
| 2006/0244616 A1 * | 11/2006 | Hill | 340/604 |
| 2007/0157704 A1 * | 7/2007 | Jenneus et al. | 73/40.7 |
| 2008/0055112 A1 * | 3/2008 | McGinty et al. | 340/870.16 |
| 2008/0068189 A1 * | 3/2008 | Murphy | 340/605 |
| 2009/0126465 A1 * | 5/2009 | Kedjierski et al. | 73/40.5 R |
| 2009/0126517 A1 * | 5/2009 | Lorentz et al. | 73/865.8 |
| 2009/0140866 A1 * | 6/2009 | Heilmann et al. | 340/605 |
| 2009/0277249 A1 * | 11/2009 | Polster et al. | 73/40.7 |
| 2010/0073162 A1 * | 3/2010 | Johnson et al. | 340/540 |
| 2010/0180956 A1 * | 7/2010 | Sharp | 137/15.18 |
| 2010/0288020 A1 * | 11/2010 | Enquist | 73/40.7 |
| 2011/0219855 A1 * | 9/2011 | Lucente et al. | 73/40.7 |
| 2013/0167618 A1 * | 7/2013 | Grosse Bley | 73/40 |

* cited by examiner

METHOD FOR TESTING THE TIGHTNESS OF WATER CONDUCTING COMPONENTS IN A HOUSING

This application is a national stage application under 35 U.S.C. §371 of International Application Number PCT/EP2010/066403, filed Oct. 28, 2010, which claims priority of German Patent Application Numbers 2009 056 172.2 and 2010 005 494.1, filed Nov. 27, 2009 and Jan. 23, 2010 respectively, the entire contents of each application being herein incorporated by reference.

TECHNICAL FIELD

The invention refers to a method for testing the tightness of water conducting components in a housing.

BACKGROUND

In quality testing of mass products it is often necessary to perform tightness tests. Thus, washing machines and dish washing machines have to be tested to detect possible leaks in hoses and pipes.

DE 10 2007 032 250 B3 describes a device for detecting liquid leaks, comprising a large-surface, electrically non-conductive surface element on which conductor paths are provided. An electric voltage is applied to the conductor paths. By measuring the electric resistance, it is detected whether a drop of liquid is on the surface element.

SUMMARY OF THE APPLICATION

It is an object of the invention to provide a method for testing tightness, which is suited for testing the tightness of components in an enclosing housing that contains an atmosphere.

A first variant of the invention provides that the water conducting components are filled with a combination of water and an indicator, wherein, in the event of a leaking of drops, the indicator contained therein escapes into the atmosphere enclosed by the housing and is detected by a sensor sensitive to the indicator.

The indicator may be a liquid mixed with the water or it may be a gas dissolved in the water. Particularly well suited indicators are alcohols, such as ethanol, and other liquids that quickly evaporate into atmosphere. Since a drop of water hitting a surface has a large surface area, a large amount of the indicator evaporates in short time into the atmosphere contained in the housing. A corresponding sensor i.e. a gas or vapor sensor that is selectively sensitive to the indicator, detects the occurrence of the indicator in the atmosphere and signals "leakage". Such a sensor includes a pump with which the housing atmosphere is drawn in. The housing atmosphere is supplied to a sensor that gives information about the presence of the indicator. The sensor may be a gas sensor using the measurement of infrared absorption, a mass spectrometer or the like. It is an advantage of the invention that the tightness test requires no pressure buildup in the components under test. Rather, it is possible to perform a pressure-less measurement. It is also possible for the indicator to be a gas contained in the water in dissolved form, such as $CO_2$ or helium, for instance.

A second variant of the method according to the invention provides that an indicator is introduced into a container that has at least one wall that becomes permeable upon contact with water, the container is positioned below the components to be tested, and the leakage of the indicator from the container is detected by a sensor sensitive to the indicator. Here, the effect is used that the wall of the container becomes permeable to the indicator when a drop of water falls thereon, so that the indicator escapes from inside the container into the surrounding atmosphere in the housing. The indicator is preferably gaseous or vaporous. Inert gases, in particular helium, but also $CO_2$, are the indicator gases of choice.

A special embodiment of the second variant provides that the container is formed by microcapsules filled with an indicator which is alcohol, for instance. In case of a leak, water will contact the microcapsules that are thereby destroyed. The alcohol contained in the microcapsules is set free. A corresponding sensor detects and indicates the presence of alcohol in the air. The volume of water necessary to trigger the sensor detection is very small. It is on the order of 0.1 ml. "Microcapsule" means an object having a core that is completely enclosed by a thin—possibly semi-permeable—wall. The size of the microcapsules generally is 1-1500 μm (micrometers), preferably 10 μm-300 μm, further preferred 30 μm-150 μm, but in particular cases it may also be larger, e.g. up to 2000, 3000, 4000, 5000 μm.

The microcapsules may be provided in association with other substances such as fillers, non-capsulated odorous or biological substances, possibly with inorganic or organic or even biological carriers, or together with biological materials. These may all be humidified with water, an aqueous solution or a suitable organic liquid or mixtures thereof.

In a preferred embodiment, microcapsules have semi-permeable walls. Through these walls, the active substance can diffuse into the water from the capsule. Here, water can penetrate from outside through the capsule wall, dissolve the ingredient in the core and diffuse out from the capsule together with the dissolved ingredient.

A third variant of the present method provides that a generator substance, which produces a gaseous or vaporous indicator upon contact with water, is positioned in the housing below the components under test, and that the occurrence of the indicator is detected by a sensor sensitive to the indicator. The generator substance can be stored in a water-soluble container, whereby it is protected from air humidity during storage. Only when a drop of water meets the container, whereby the wall of the container becomes permeable, will water reach the generator substance and $CO_2$, for instance, is set free and can be detected within the housing. A suited generator substance is a mixture of sodium and acid which, upon contact with water, produces $CO_2$ as the indicator. $CO_2$ is well detectable using an infrared sensor.

BRIEF DESCRIPTION OF THE DRAWINGS

The following is a detailed description of embodiments of the invention with reference to the drawings.

DETAILED DESCRIPTION OF THE EMBODIMENTS

Figure 1:
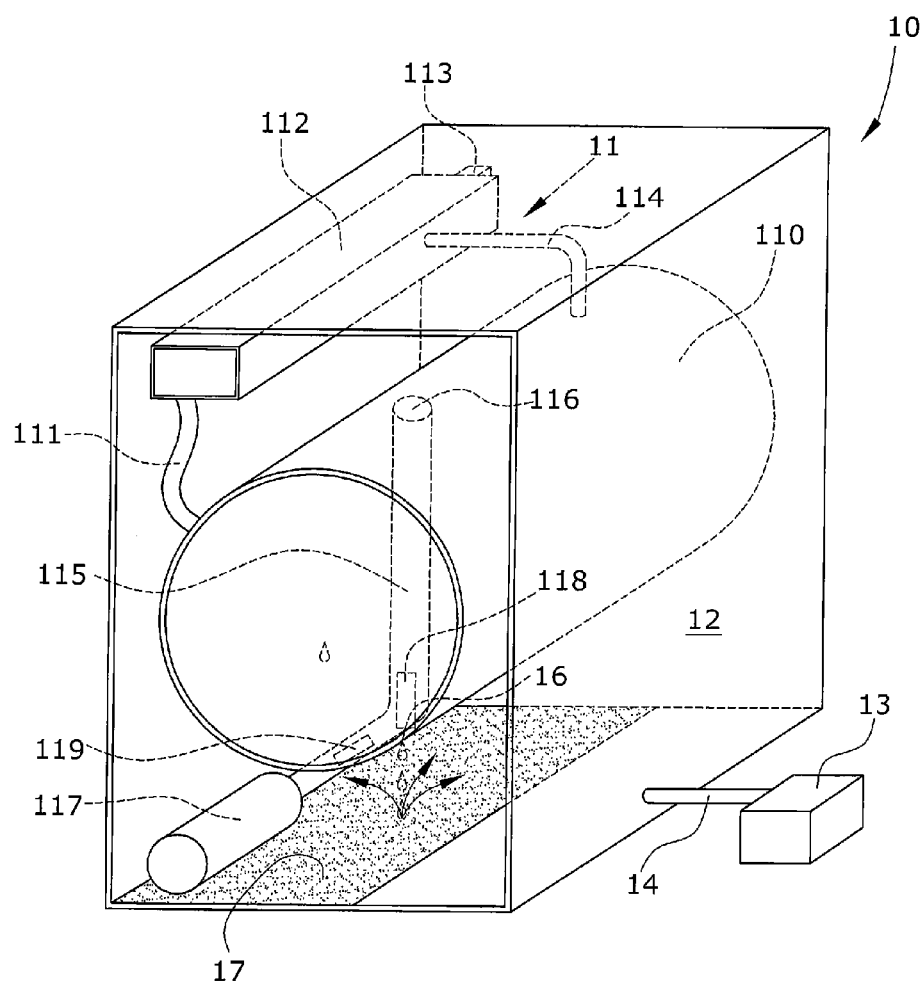
FIG. 1 illustrates a housing of a washing machine during the tightness test according to the first variant of the invention.

FIG. 1 illustrates a housing 10 containing components 11 to be tested for tightness. These components include, for instance, a suds container 110 connected to a detergent compartment 112 through a water jet tube 111, the compartment being in turn connected to a water supply 113. Further, the components include a suds container vent tube 114 that connects the suds container 110 with the detergent compartment 112, and a water drain tube 115 which has a water drain 116 at its upper end and is connected to a suds pump 117 at the bottom end. Provided at the suds container 110 is a sensor 118 for filling level control and a heater element seal 119 which also is to be tested for tightness. All parts 110 to 119 form components 11 that are subjected to the tightness test. These components are contained in the interior 12 of the housing 10 which contains an atmosphere that corresponds to ambient air. The housing 10 encloses the interior 12 on all sides, while an absolute gas sealing of the interior is not required. It is important that the interior contains a gas volume that is delimited over the environment of the housing 10 so that an indicator substance in the interior 12 can be detected.

A sensor 13 serves to detect the indicator, the sensor being connected with the interior 12 through a line 14. The sensor 13 includes a suction pump (not illustrated) that draws gas from the housing 10 and allows it to escape into the ambient atmosphere. The sensor may be of the type HLD5000 manufactured by INFICON GmbH. This sensor is an infrared cuvette.

The test for tightness is to show whether small quantities of water in the form of drops escape from the components 11. A measurement of the air humidity in the housing 10 would not be sensitive enough or would take too much time. According to the invention, an indicator, such as alcohol or the like, is added to the water. Drops 15 that fall through a water leak 16 of a component 11, fall on the floor 17, where they burst. A drop of 0.1 ml of a 10% ethanol/water mixture in a volume of the size of a washing machine can be detected within three minutes by the HLD5000 device. It would be advantageous to have a convection of the atmosphere in the interior 12 by means of a blower or by a drive of the washing machine (not illustrated).

Figure 2:
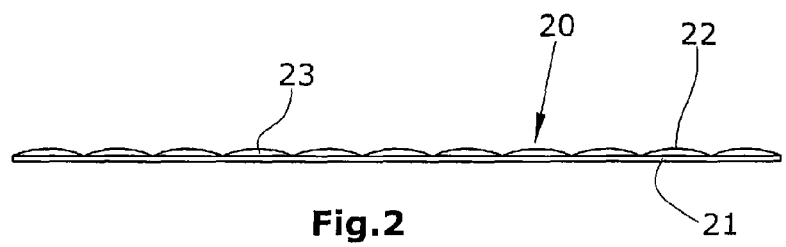
FIG. 2 is a side elevational view of a container for carrying out the second variant of the method of the invention.
Figure 3:
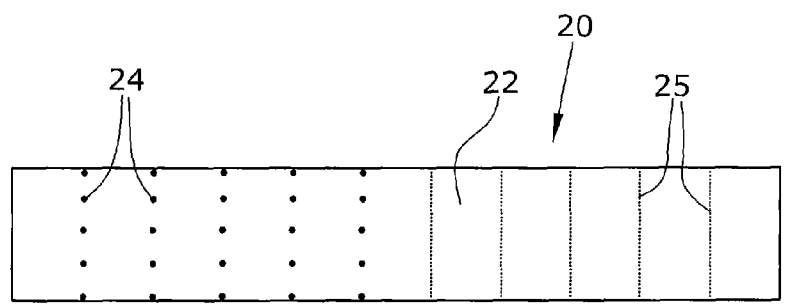
FIG. 3 is a top plan view of the container of FIG. 2, illustrating two alternative types of welding of the film layers.

FIGS. 2 and 3 illustrate a device for performing the second variant of the method. This device comprises a container 20 formed by a carrier film 21 and a wall 22, formed by another film arranged on the carrier film, the wall becoming permeable upon contact with water. Cavities 23 exist between the carrier film 21 and the wall 22, which are filled with an indicator. The wall 22 is connected with the carrier film 21 either at isolated spot-welding points 24 or by line-shaped welding seams. In the case of spot-welding points, a uniform space is formed, while separated film pockets are formed by line-shaped welding seams.

Polyvinyl alcohol films (PVOH, also PVAL) are a suitable material for the wall 22. Such films are water soluble. They are commercially available under the trade name SOLUBLON or SOKUFOL. PVOH films are gas-tight to many gases and are mechanically comparatively robust. They are not hygroscopic, but establish a balance with the ambient humidity, i.e. they absorb humidity and also release it again. They are well weldable using commercially available film-welding machines.

Various gases could be used as the indicator inside the container 20, in particular inert gases, but also $CO_2$.

The flexible container 20 designed as a film bag forms a water-soluble gas storage spread on the bottom of the housing. When a drop falls on the wall 22, the same becomes permeable to the indicator so that the indicator escapes into the atmosphere in the interior of the housing. The sensor detects the present of the indicator in the interior.

Figure 4:
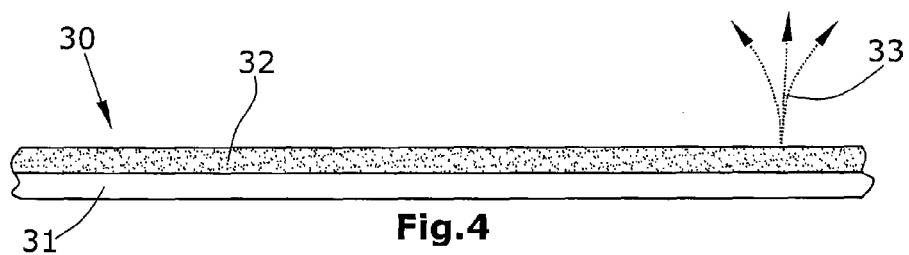
FIG. 4 illustrates a material made from a substrate coated with the generator substance for performing the third variant of the method of the invention.

FIG. 4 shows a device 30 for carrying out the third method variant. This device comprises a substrate 31 of a carrier film. The substrate 31 carries a coating 32 including a generator substance that releases a gaseous indicator 33 upon contact with water. The two-dimensional device 30 is placed on the bottom of the housing. When a drop falls on the device 30, the generator substance 32 produces the indicator 33 that is detected by the sensor connected to the housing.

The indicator gas is generated through a chemical reaction. For example, the generator substance is a sodium-tartaric acid powder $2\ NaHCO_3 + C_4H_6O_6$. When water is added, the following reaction occurs:

$$2NaHCO_3 + C_4H_6O_6 \rightarrow C_4H_4O_6Na_2 + 2H_2O + 2CO_2$$

The indicator gas $CO_2$ is produced thereby, which gas can be detected by suitable sensors.

It would also be possible to use potassium hydrogen carbonate, sodium carbonate, potassium carbonate or calcium carbonate instead of sodium hydrogen carbonate. Instead of tartaric acid, other acids or acidulous substances could also be used.

The invention claimed is:

1. A method of testing the tightness of water conducting components in a housing, said method comprising the steps of:
    introducing a generator substance, which upon contact with water produces a gaseous or vaporous indicator;
    positioning the generator substance in the housing below the components under test; and
    detecting the occurrence of the indicator using a sensor sensitive to the indicator wherein the generator substance used is a mixture of sodium and acid, which produces $CO_2$ as the gaseous or vaporous indicator upon contact with water.

2. The method of claim 1, wherein the generator substance is provided on a substrate.

3. The method of claim 1, further comprising the step of containing the generator substance in a container that comprises at least one wall that becomes permeable to the generator substance upon contact with water.

4. The method of claim 1, wherein the sensor used is a gas sensor with an IR section, into which sensor the atmosphere in the interior of the housing is drawn.

5. The method of claim 1, including the additional step of applying said method in the testing of household appliances, such as washing machines or dish washing machines.

* * * * *